(12) United States Patent
Zhang

(10) Patent No.: US 11,517,021 B2
(45) Date of Patent: Dec. 6, 2022

(54) DISINFECTION COMPOSITION AND PREPARATION METHOD THEREFOR AND USE THEREOF

(71) Applicant: Nanjing Hejiyuan Biological Technology Co., Ltd., Nanjing (CN)

(72) Inventor: Shuqing Zhang, Nanjing (CN)

(73) Assignee: Nanjing Hejiyuan Biological Technology Co., Ltd., Nanjing (CN)

( * ) Notice: Subject to any disclaimer, the term of this patent is extended or adjusted under 35 U.S.C. 154(b) by 0 days.

(21) Appl. No.: 17/352,076

(22) Filed: Jun. 18, 2021

(65) Prior Publication Data

US 2022/0330554 A1 Oct. 20, 2022

(30) Foreign Application Priority Data

Apr. 8, 2021 (CN) .......................... 202110376542.9

(51) Int. Cl.
| | | |
|---|---|---|
| *A01N 65/28* | (2009.01) | |
| *A01N 25/02* | (2006.01) | |
| *A01N 65/22* | (2009.01) | |
| *A01N 65/40* | (2009.01) | |
| *A01N 31/02* | (2006.01) | |
| *A01N 57/12* | (2006.01) | |
| *A01N 37/04* | (2006.01) | |

(52) U.S. Cl.
CPC ............ *A01N 65/28* (2013.01); *A01N 25/02* (2013.01); *A01N 31/02* (2013.01); *A01N 37/04* (2013.01); *A01N 57/12* (2013.01); *A01N 65/22* (2013.01); *A01N 65/40* (2013.01)

(58) Field of Classification Search
CPC ........ A01N 31/02; A01N 65/28; A01N 25/02; A01N 57/12; A01N 65/22; A01N 37/04; A01N 65/40
See application file for complete search history.

(56) References Cited

U.S. PATENT DOCUMENTS

| 10,743,543 B2 | 8/2020 | Zhang |
| 2007/0184016 A1* | 8/2007 | Macinga .............. A61K 31/785 424/78.27 |
| 2018/0153176 A1* | 6/2018 | Zhang .................... A01N 31/02 |

FOREIGN PATENT DOCUMENTS

| AU | 2017272158 | 6/2018 |
| CN | 106665700 | 5/2017 |
| CN | 106665700 A | 5/2017 |
| CN | 106912580 A | 7/2017 |
| CN | 106973892 A | 7/2017 |
| CN | 107223708 A | 10/2017 |
| CN | 107865067 A | 4/2018 |
| CN | 109512741 A | 3/2019 |
| EP | 3332643 | 6/2018 |
| ES | 2828440 | 5/2021 |
| HK | 1248467 | 10/2018 |
| JP | 6505818 | 4/2019 |
| PL | 3332643 | 4/2021 |
| PT | 3332643 | 11/2020 |

OTHER PUBLICATIONS

Tang, Observation of germicidal effect of a compound plant essential oil disinfectant, Chinese Journal of Disinfection 2020; 37(3), pp. 164-167.
Chinese Office Action for CN App. No. 2021103765429 dated Jun. 24, 2022, 14 pages.
Chinese Office Action from Chinese App. No. 2021103765429 dated Aug. 26, 2022, 8 pages.

* cited by examiner

*Primary Examiner* — Mina Haghighatian
(74) *Attorney, Agent, or Firm* — Dinsmore & Shohl LLP

(57) ABSTRACT

Provided is a disinfection composition, preparation method therefor and use thereof. The disinfection composition comprises the following raw materials in parts by weight: 2.2-4.8 parts of disinfection essential oil, 3-8 parts of polyethylene glycol hydrogenated castor oil, 0.05-0.5 parts of phytic acid, 0.05-0.5 parts of citric acid, 20-40 parts of a $C_2$-$C_3$ monohydric alcohol, and 45-62.1 parts of water. The disinfection composition of the present invention has significantly improved chemical stability, and still has good disinfection effect after storage for 3 months at 37° C., and has a significantly improved disinfection effect, a shortened action time, and an increased killing log value.

20 Claims, No Drawings

DISINFECTION COMPOSITION AND PREPARATION METHOD THEREFOR AND USE THEREOF

CROSS-REFERENCE TO RELATED APPLICATIONS

This application claims priority benefits to Chinese Patent Application No. 202110376542.9, filed on Apr. 8, 2021. The contents of the aforementioned application are incorporated herein by reference.

TECHNICAL FIELD

The present invention relates to the field of disinfection composition, in particular to a disinfection composition and preparation method therefor and use thereof.

BACKGROUND OF THE INVENTION

Botanical disinfection products are prepared mainly with organic compounds having antimicrobial activities contained in plant secondary metabolites. Such organic compounds having antimicrobial activities include terpenes, alkaloids and phenolic compounds. Compared with traditional chemosynthetic disinfection compositions, botanical disinfection products have many advantages. For example, botanical disinfection products are completely decomposable, environmentally friendly, safe, reproducible, mild, non-irritating, and not prone to drug resistance.

The inventor of the present invention disclosed in CN106665700A a botanical disinfection composition comprising tea tree essential oil, niaouli essential oil, palmarosa essential oil, lemon mint essential oil, and *Litsea cubeba* essential oil. The essential oils in the composition can work synergistically to achieve a multi-target sterilization effect and show good disinfection effect. The amount of ethanol in the composition was reduced, but the disinfection effect of the essential oils was guaranteed. In addition, the preparation process for the botanical disinfection composition is simple, reasonable and low in cost. However botanical disinfection composition usually comprises many essential oils, thus the formulation is complex and stability tends to be poor. In previous study by the inventor, Tween 80, ethanol, propylene glycol and disodium EDTA were introduced to form an emulsion, thereby improving the physical stability of disinfection essential oils in a certain extent. However in recent studies by the inventor, it is found that emulsion may have poor chemical stability and the content of active ingredients may be reduced during storage, resulting in a decrease in the disinfection effect and a short product validity period. Additionally the inventor further finds that the disinfection effect of the emulsion is lower than that of purely disinfection essential oils, especially when a large amount of auxiliary materials are added. The addition of auxiliary materials may weaken the sterilization effect of the disinfection essential oil, but reducing the amount of auxiliary materials may reduce the stability of the entire system, resulting in a significant reduction in the disinfection effect after a period of time.

Therefore, seeking a disinfection product with good chemical stability and strong disinfection effect is an urgent technical problem in the promotion and utilization of botanical disinfection products.

SUMMARY OF THE INVENTION

Therefore, the object of the present invention is to provide a disinfection composition with good chemical stability and strong disinfection effect, and a preparation method therefor and use thereof.

According to a first aspect, the present application provides a disinfection composition, comprising the following raw materials in parts by weight:
- 2.2-4.8 parts of disinfection essential oil,
- 3-8 parts of polyethylene glycol hydrogenated castor oil,
- 0.05-0.5 parts of phytic acid,
- 0.05-0.5 parts of citric acid,
- 20-40 parts of $C_2$-$C_3$ monohydric alcohol, and
- 45-62.1 parts of water.

Alternatively, the polyethylene glycol hydrogenated castor oil is polyethylene glycol 40 hydrogenated castor oil, polyethylene glycol 60 hydrogenated castor oil or a mixture thereof.

Alternatively, the $C_2$-$C_3$ monohydric alcohol is ethanol, isopropanol or a mixture thereof.

Alternatively, the disinfection essential oil is at least one selected from the group consisting of tea tree essential oil, niaouli essential oil, palmarosa essential oil, lemon mint essential oil, lemon myrtle essential oil and *Litsea cubeba* essential oil.

Alternatively, the disinfection essential oil comprises the following raw materials in parts by weight:
- 0.5-1.0 parts of tea tree essential oil,
- 0.3-1.0 parts of niaouli essential oil,
- 0.3-1.0 parts of palmarosa essential oil,
- 0.2-1.0 parts of lemon mint essential oil, and
- 0.3-1.0 parts of lemon myrtle essential oil and/or *Litsea cubeba* essential oil.

Alternatively, the disinfection composition further comprises 0.3-1.0 part of azelaic acid.

Alternatively, the disinfection composition further comprises 4-6 parts of cosolvent.

Alternatively, the disinfection composition further comprises 0.3-1.0 part of azelaic acid and 4-6 parts of cosolvent.

Alternatively, the cosolvent is at least one selected from the group consisting of 1,2-propylene glycol, glycerin, and polyethylene glycol.

In the present application, the water can be, but is not limited to, at least one selected from the group consisting of distilled water, purified water, and deionized water.

Alternatively, the disinfection composition comprises the following raw materials in parts by weight:
- 0.6 parts of tea tree essential oil,
- 0.5 parts of niaouli essential oil,
- 0.5 parts of palmarosa essential oil,
- 0.2 parts of lemon mint essential oil,
- 0.5 parts of *Litsea cubeba* essential oil,
- 0.5 parts of azelaic acid,
- 4.3 parts of polyethylene glycol 40 hydrogenated castor oil,
- 0.05 parts of phytic acid,
- 0.05 parts of citric acid,
- 30 parts of ethanol,
- 4 parts of 1,2-propylene glycol, and,
- 58.8 parts of water;

Alternatively, the disinfection composition comprises the following raw materials in parts by weight:
- 0.5 parts of tea tree essential oil,
- 0.3 parts of niaouli essential oil,
- 0.3 parts of palmarosa essential oil,
- 0.5 parts of lemon mint essential oil, 0.7 parts of *Litsea cubeba* essential oil,
0.5 parts of azelaic acid,
3.2 parts of polyethylene glycol 40 hydrogenated castor oil,
0.05 parts of phytic acid,
0.05 parts of citric acid,
30 parts of ethanol,
4 parts of 1,2-propylene glycol, and,
60.4 parts of water;

Alternatively, the disinfection composition comprises the following raw materials in parts by weight:
0.7 parts of tea tree essential oil,
0.5 parts of niaouli essential oil,
0.5 parts of palmarosa essential oil,
0.3 parts of lemon mint essential oil,
0.4 parts of *Litsea cubeba* essential oil,
0.5 parts of azelaic acid,
4.8 parts of polyethylene glycol 40 hydrogenated castor oil,
0.05 parts of phytic acid,
0.05 parts of citric acid,
30 parts of ethanol,
4 parts of 1, 2-propylene glycol, and,
58.2 parts of water;

Alternatively, the disinfection composition comprises the following raw materials in parts by weight:
0.5 parts of tea tree essential oil,
0.5 parts of niaouli essential oil,
0.5 parts of palmarosa essential oil,
0.2 parts of lemon mint essential oil,
0.5 parts of *Litsea cubeba* essential oil,
0.5 part of azelaic acid,
4.6 parts of polyethylene glycol 40 hydrogenated castor oil,
0.05 parts of phytic acid,
0.05 parts of citric acid,
30 parts of ethanol,
4 parts of 1,2-propylene glycol, and,
58.6 parts of water.

According to a second aspect, the present application provides a method for preparing a disinfection composition, comprising:
a premixing step which comprises preparing a first premixtrue by mixing citric acid with water and/or a $C_2$-$C_3$ monohydric alcohol, or by mixing citric acid and phytic acid with water and/or a $C_2$-$C_3$ monohydric alcohol; and
a total mixing step which comprises preparing a first mixture by successively mixing a polyethylene glycol hydrogenated castor oil, the first premixture and a disinfection essential oil, or by mixing a disinfection essential oil and a polyethylene glycol hydrogenated castor oil; and preparing a disinfection composition by mixing the first mixture, the first premixture and remaining raw materials.

Alternatively, the method for preparing the disinfection composition comprises:
a premixing step which comprises preparing a first premixture by mixing citric acid, phytic acid and water, preparing a surfactant by mixing a cosolvent and polyethylene glycol hydrogenated castor oil, and preparing an alcoholic solution containing azelaic acid by mixing azelaic acid and a $C_2$-$C_3$ monohydric alcohol; and
a total mixing step which comprises preparing a disinfection composition by successively mixing the surfactant, the first premixture, the alcoholic solution containing azelaic acid and a disinfection essential oil, or by successively mixing the surfactant, the alcoholic solution containing azelaic acid, the first premixture and a disinfection essential oil.

Alternatively, the method for preparing the disinfection composition comprises:
a premixing step which comprises preparing a first premixture by mixing citric acid, phytic acid, water, azelaic acid and a $C_2$-$C_3$ monohydric alcohol; and preparing a surfactant by mixing a cosolvent and a polyethylene glycol hydrogenated castor oil; and
a total mixing step which comprises preparing a disinfection composition by successively mixing the surfactant, the first premixture and a disinfection essential oil.

Alternatively, the method for preparing the disinfection composition comprises:
a premixing step which comprises preparing a first premixture by mixing citric acid, phytic acid, water and azelaic acid, or by mixing citric acid, phytic acid and water; preparing a surfactant by mixing a cosolvent and a polyethylene glycol hydrogenated castor oil; and
a total mixing step which comprises preparing a disinfection composition by successively mixing the surfactant, the first premixture, a $C_2$-$C_3$ monohydric alcohol and a disinfection essential oil, or by successively mixing the surfactant, a $C_2$-$C_3$ monohydric alcohol, the first premixture and a disinfection essential oil.

Alternatively, the method for preparing the disinfection composition comprises:
a premixing step which comprises preparing a first premixture by mixing citric acid, phytic acid and a $C_2$-$C_3$ monohydric alcohol; preparing a surfactant by mixing a cosolvent and a polyethylene glycol hydrogenated castor oil; and preparing an aqueous solution containing azelaic acid by mixing azelaic acid and water; and
a total mixing step which comprises preparing a disinfection composition by successively mixing the surfactant, the first premixture, the aqueous solution containing azelaic acid and a disinfection essential oil, or by successively mixing the surfactant, the aqueous solution containing azelaic acid, the first premixture and a disinfection essential oil.

Alternatively, the method for preparing the disinfection composition comprises:
a premixing step which comprises preparing a first premixture by mixing citric acid and water; preparing a surfactant by mixing a cosolvent and a polyethylene glycol hydrogenated castor oil; and preparing an alcoholic solution containing azelaic acid by mixing azelaic acid and a $C_2$-$C_3$ monohydric alcohol; and
a total mixing step which comprises preparing a disinfection composition by successively mixing the surfactant, the first premixture, the alcoholic solution containing azelaic acid, phytic acid and a disinfection essential oil, or by successively mixing the surfactant, the first premixture, phytic acid, the alcoholic solution containing azelaic acid and a disinfection essential oil, or by successively mixing the surfactant, the alcoholic solution containing azelaic acid, phytic acid, the first premixture and a disinfection essential oil, or by successively mixing the surfactant, the alcoholic solution containing azelaic acid, the first premixture, phytic acid and a disinfection essential oil.

Alternatively, the method for preparing the disinfection composition comprises:
a premixing step which comprises preparing a first premixture by mixing citric acid and a $C_2$-$C_3$ monohydric alcohol; preparing a surfactant by mixing a cosolvent and a polyethylene glycol hydrogenated castor oil; and prepating an aqueous solution containing azelaic acid by mixing azelaic acid and water; and a total mixing step which comprises preparing a disinfection composition by successively mixing the surfactant, the first premixture, the aqueous solution containing azelaic acid, phytic acid and a disinfection essential oil, or by successively mixing the surfactant, the aqueous solution containing azelaic acid, phytic acid, the first premixture and a disinfection essential oil, or by successively mixing the surfactant, the first premixture, phytic acid, the aqueous solution containing azelaic acid and a disinfection essential oil; or by successively mixing the surfactant, the aqueous solution containing azelaic acid, the first premixture and a disinfection essential oil.

Alternatively, in prior to said total mixing step, the disinfection essential oil used in the above methods is prepared by mixing raw materials thereof.

Alternatively, in prior to said total mixing step, the disinfection essential oil used in the above methods is prepared by mixing tea tree essential oil, niaouli essential oil, palmarosa essential oil, lemon mint essential oil, and lemon myrtle essential oil/*Litsea cubeba* essential oil, in prior to preparing the disinfection composition.

Alternatively, in the premixing step, the raw materials are mixed under stirring and heated to 25-45° C.

Alternatively, the premixing step comprises preparing a disinfection essential oil by weighing out tea tree essential oil, niaouli essential oil, palmarola essential oil, lemon mint essential oil, and *Litsea cubeba* essential oil according to the formulation, mixing well, stirring and heating to 25-45° C.

Alternatively, the premixing step comprises preparing a first premixture by weighing out citric acid, phytic acid and water according to the formulation, mixing and stirring well, heating to 25-45° C. under stirring.

Alternatively, the premixing step comprises preparing a surfactant by weighing out polyethylene glycol 40 hydrogenated castor oil and 1,2-propylene glycol according to the formulation, mixing and stirring well, heating to 25-45° C. under stirring.

Alternatively, the premixing step comprises preparing an alcohol solution containing azalea acid by weighing out ethanol and azalea acid according to the formulation, stirring well, and heating to 25-45° C. under stirring.

Alternatively, said total mixing step is carried out at a vacuum pressure of greater than or equal to 0.2 MPa, preferably equal to 0.2 MPa, and a temperature of 25-45° C., preferably 40-45° C., under stirring at a speed of 50-150 rpm, preferably 80-120 rpm, and wherein each material is fed at an interval of at least 5 minutes, preferably 5-10 minutes.

Alternatively, after the total mixing step is completed, the prepared disinfection composition is further stirred for at least 5 minutes, preferably 5-10 minutes, at a vacuum pressure of greater than or equal to 0.4 MPa, preferably equal to 0.4 MPa, a temperature of 25-45° C., preferably 40-45° C., under stirring at a speed of 200-500 rpm, preferably 200-300 rpm.

After the mixing is finished, pressure is relieved and temperature is lowered, and filtration is performed to remove impurities and bacteria, thereby obtaining the disinfectant composition.

Filtration to remove impurities and bacteria can be performed with conventional technologies in the field. In the present invention, the filtration is performed by passing the prepared liquid mixture through a 0.25 µm filter membrane to remove impurities and bacteria.

The present invention also provides use of the disinfection composition mentioned above or use of the disinfection composition prepared by the preparation method mentioned above in disinfection.

At present, most of research and developments for botanical antibacterial materials at home and abroad are concentrated on antibacterial and bacteriostasis effects, and most outputs relate to antibacterial and bacteriostasis effects. So far there are no products that can achieve the true disinfection effect. Antibacterial and bacteriostasis are different from disinfection in definition. According to the Chinese Standard WS466-2014 "Terminology in Disinfection Industry" (Implemented on Feb. 1, 2015), bacteriostasis refers to a process for inhibiting or preventing the growth and activity of bacteria by chemical or physical methods; antibacterial refers to a process for killing or preventing the growth and activity of bacteria by chemical or physical methods; and disinfection refers to a process for killing or removing pathogenic microorganisms on a media to a harmless level. Detection methods and evaluation standards are different for disinfection and antibacterial (bacteriostasis). Detection and evaluation of disinfection are conducted according to "*Technical Standard for Disinfection*" (2002 Edition); Detection and evaluation of antibacterial (bacteriostasic) agents are conducted according to GB15979-2002 "Hygienic Standard for Disposable Sanitary Products" and WS/T650-2019 "Evaluation method for bacteriostatic and antibacterial effect". Specifically, firstly, for antibacterial/bacteriostasis effect detection and evaluation, the used test solution has a bacterial concentration of $1\times10^4$-$9\times10^4$cfu/ml, prepared with phosphate buffer. For detection and evaluation of disinfection effect, disinfection effect against bacterial propagule is detected and evaluated with a suspension having a bacterial propagule concentration of $1\times10^8$-$5\times10^8$ cfu/ml prepared with tryptone saline solution (TPS); Disinfection effect against *Candida albicans* (fungi) is detected and evaluated with a suspension having a *Candida albicans* (fungi) concentration of $1\times10^7$-$5\times10^7$cfu/ml, and disinfection effect against *Mycobacterium chelonae* subspecies *abscessus* (mycobacterium) is detected and evaluated with a suspension having a *Mycobacterium chelonae* subspecies *abscessus* concentration of $1\times10^7$-$5\times10^7$cfu/ml, and organic interference substances (3% bovine serum albumin) must be added to both of the suspensions, which greatly increases the difficulty for killing the microorganisms by the disinfectant. Secondly, for different microorganisms to be killed, the requirements for a qualified disinfection are different: A qualified disinfection requires a killing log value of ≥5.0 for bacterial propagules (i.e., killing rate ≥99.999%) and a killing log value of ≥4.0 for viruses and mycobacteria (i.e., killing rate ≥99.99%); In contrast, an antibacterial agent is considered as qualified when its killing rate against bacteria is ≥90%. The comparison of the two indicates that the killing rate required by a qualified disinfectant is 1000-10000 times higher than the killing rate required by a qualified antibacterial agent; The killing rate required by a qualified antibacterial agent having no neutralizer is ≥50% which is far lower that the killing rate required by a qualified disinfectant. In other words, a qualified antibacterial/bacteriostatic agent cannot necessarily meet the disinfection standards.

According to another aspect, the present invention provides use of the above-mentioned disinfection composition or the disinfection composition prepared by the above-mentioned preparation methods for killing bacterial propagules, mycobacteria, fungi or viruses.

Optionally, the bacterial propagule includes at least one of pyogenic cocci, enteropathogenic bacteria, and common pathogens in hospital; the fungus includes *Candida* and/or yeast; and the virus is influenza a virus A/PR8/34 H1N1, or Coronavirus HCoV-229E.

Optionally, the pyogenic cocci includes but is not limited to *Staphylococcus, Streptococcus*, and *Neisseria*; the enteropathogenic bacteria includes but is not limited to *Salmonella, Shigella, Escherichia, Citrobacter, Klebsiella, Enterobacter*; the common pathogens in hospital includes but is not limited to *Pseudomonas aeruginosa, Acinetobacter baumannii.*

Preferably, the *Candida* is *Candida albicans*.

Preferably, the *Staphylococcus* includes *Staphylococcus aureus*.

The *mycobacterium* includes *Mycobacterium chelonae*.

The *Escherichia* includes *Escherichia coli*.

The disinfectant composition of the present invention can effectively kill enteropathogenic bacteria, pyogenic cocci, common pathogens in hospital, mycobacteria, *Candida*, yeasts, etc., and in particular, bacteria such as *Mycobacterium* and *Pseudomonas aeruginosa* that are difficult to kill effectively by common disinfection compositions have specific sensitivity to the disinfection composition of the present invention.

According to another aspect, the present invention provides use of the above-mentioned disinfection composition or the disinfection composition prepared by the above-mentioned preparation methods for killing *Mycobacterium chelonae, Candida albicans* and *Escherichia coli, Pseudomonas aeruginosa, Staphylococcus aureus*, influenza a virus A/PR8/34 H1N1, coronavirus HCoV-229E.

According to another aspect, the present invention provides a method for using the above-mentioned disinfection composition or the disinfection composition prepared by the above-mentioned preparation methods, including or not including a step of diluting the disinfection composition with water.

According to another aspect, the present invention provides a method of disinfection for non-therapeutic purposes, comprising applying any one of the disinfection compositions or the disinfection composition prepared by any one of the above-mentioned preparation methods or applying the diluted disinfection composition.

The technical solutions described in the present invention have the following advantages:

1. It is found by the inventor that when Tween-based solubilizers were added, the antibacterial effect of essential oils decreased in the disinfection experiment. The reason may be that the Tween molecule has a certain promotion effect on the growth of the bacteria, and when the solubilization effect of Tween molecule on the essential oil and the effect on the growth of the bacteria exist at the same time, the effect on the growth of the bacteria is more obvious. The disinfection composition provided by the present invention is obtained by mixing disinfecting essential oils, polyethylene glycol hydrogenated castor oil, phytic acid, citric acid, $C_2$-$C_3$ monoalcohol and water in a specific ratio range, and thus the chemical stability is significantly improved. For example, the disinfection effect is still good after storage at 54° C. for 14 days or at 37° C. for 3 months. Moreover, the disinfection composition has a significantly enhanced disinfection effect, shortens the action time to meet a qualified disinfection level, and improves the killing log value against various pathogenic microorganisms.

2. It is found by the inventor that in the disinfection experiment, although less than 0.54% of citric acid and less than 43% of $C_2$-$C_3$ monohydric alcohol alone have no disinfection effect, low content of citric acid has activation and synergistic effects on low content of $C_2$-$C_3$ monoalcohol; The aqueous solution containing low content of citric acid and low content of $C_2$-$C_3$ monohydric alcohol has a significantly improved disinfection effect, indicating that the combined use of citric acid and $C_2$-$C_3$ monohydric alcohol has a synergistic effect, and aqueous solution containing the low content of $C_2$-$C_3$ monohydric alcohol with almost no disinfection effect has a good disinfection effect, thereby improving the overall disinfection effect of the disinfection composition. Wherein the $C_2$-$C_3$ monohydric alcohol can be ethanol, isopropanol or mixture thereof.

For example, it is known in the art ethanol can have disinfection effect at a concentration of at least 75 vol. %, which is converted into a mass percentage is 67.8%; Citric acid can have disinfection effect at a concentration of at least 2% by weight at 80° C., and is mainly used for the disinfection of medical dialysis machines. The ethanol with a mass percentage of less than 43% and citric acid with a mass percentage of less than 0.54% have no sterilization and disinfection effect respectively. Tests show that ethanol with a mass percentage of less than 43% or citric acid with a mass percentage of less than 0.54% alone has a killing log value of less than 0.5 against *Staphylococcus aureus* after action for 10-40 minutes. However, the combined use of less than 43% ethanol and less than 0.54% citric acid can significantly increase the killing log value against *Staphylococcus aureus* to 2.26-7.41 after action for 10-40 minutes, and with the extension of the action time, the killing log value continues to increase, which is much higher than the case of using 25-40% ethanol or 0.05-0.5% citric acid alone. A qualified disinfection (killing log value ≥5) can be reached at 30 minutes, indicating that the combined use of citric acid and ethanol has a synergistic effect, which can significantly improve the sterilization and disinfection effect, thereby improving the overall disinfection effect of the disinfection composition.

3. In the disinfection composition provided by the present invention, phytic acid is used to replace the EDTA disodium salt in the original formulation as a stabilizer, so that phytic acid can cooperate with other ingredients in the formulation to significantly improve the stability of the disinfection composition. For example, the disinfection effect is still good after storage at 37° C. for 3 months, thereby extending the storage period.

In addition, the disinfection composition obtained through the above-mentioned composition and ratio can have a pH between 2.5 and 4.5. In this pH range, antioxidant properties of plant essential oils can be enhanced, thereby maintaining the stability of the disinfectant composition, and improving sterilization and disinfection effect of the disinfection composition. The disinfectant composition can be safely applied on human skin or hands.

4. In the disinfection composition provided by the present invention, the polyethylene glycol hydrogenated castor oil is polyethylene glycol 40 hydrogenated castor oil, polyethylene glycol 60 hydrogenated castor oil, or a mixture thereof; Experiments show that the disinfection composition formed by polyethylene glycol 40 hydrogenated castor oil has better disinfection effect and stability. When acting on microorganisms, qualified disinfection can be realized in a shorter disinfection time, or a higher killing logarithmic value can be obtained.

5. In the disinfection composition of the present invention, the disinfection essential oil is selected from at least one of tea tree essential oil, niaouli essential oil, palmarosa essential oil, lemon mint essential oil, lemon myrtle essential oil and *Litsea cubeba* essential oil. For the disinfection composition, one or more of the above disinfection essential oils can be selected, and a good disinfection effect can be achieved under the ratio of disinfection essential oils and other auxiliary materials as defined in the present invention.

When only one kind of disinfection essential oil is used, this kind of disinfection essential oil occupies a larger mass percentage of the disinfection composition, which is likely to cause irritation to the skin or eyes. When multiple disinfection essential oils are combined, each disinfectant essential oil is adjusted to a mass percentage of less than 1.8%, preferably less than 1.5%, more preferably less than 1%, such that the irritation effect produced is significantly reduced, or even no irritation effect. Preferably, the disinfection essential oil comprises the following raw materials in parts by weight: 0.5-1.0 part of tea tree essential oil, 0.3-1.0 part of niaouli essential oil, 0.3-1.0 part of palmarosa essential oil, 0.2-1.0 part of lemon mint essential oil, and 0.3-1.0 part of lemon myrtle essential oil and/or *Litsea cubeba* essential oil. When a disinfection essential oil with the above-mentioned formulation is added to the disinfection composition, a good disinfection effect can be obtained, and no toxicity is observed in oral toxicity test and acute inhalation test evaluation, and no irritation is observed in acute eye irritation and multiple skin irritation tests, and no chromosome damage effect was seen in micronucleus test. In addition, due to the synergistic effect of citric acid and ethanol and the use of polyethylene glycol hydrogenated castor oil and phytic acid in the present invention, the disinfection effect of the disinfection composition is significantly improved, so that the dosages of niaouli essential oil, palmarosa essential oil and lemon mint essential oil can be appropriately reduced, and the entire disinfection composition still has a good disinfection effect.

6. The disinfection composition provided by the present invention further includes azelaic acid and/or cosolvent. Both azelaic acid and cosolvent can be used with disinfection essential oils to have synergistic effects, and have a penetration promoting effect, which can carry the bactericidal components in the disinfectant essential oil to quickly penetrate the outer cell membrane of the pathogenic bacteria to achieve the bactericidal effect and shorten the sterilization time to meet the requirements of the disinfection qualification.

7. The method for preparing the disinfection composition provided by the present invention includes a pre-mixing step and a total mixing step. The method is simple, and the cost is low, and disinfection compositions in the form of a microemulsion can be obtained without a homogenization process.

8. For the method for preparing the disinfection compound, in the total mixing step, the vacuum pressure is not less than 0.2 MPa, the temperature is 25-45° C., the stirring speed is 50-150 rpm, and each material is fed at an interval of at least 5 minutes; Preferably, in the total mixing step, the vacuum pressure is 0.2 MPa, the temperature is 40-45° C., the stirring speed is 80-120 rpm, and each material is fed at an interval of 5-10 minutes. In this way, the particle size of the disinfection composition can be significantly reduced, and the particle size range of the disinfectant composition is narrowed advantageously, so that the particle size distribution of the disinfection composition is narrow and uniform, and the dispersion and stability of the prepared emulsion are good. The microemulsion with small particle size, due to its small size effect and volume effect, improves the electro-adsorption (van der Waals force) and permeability of the disinfectant, which helps to enhance the disinfection effect.

9. After the total mixing step is completed, the method for preparing the disinfection compound provided by the present invention further includes continuing to stir the mixed solution for at least 5 minutes under the conditions of vacuum pressure not less than 0.4 MPa, temperature of 25-45° C., and stirring speed of 200-500 rpm; preferably, after the total mixing step is completed, the method further includes continuing to stir the mixed solution for 5-10 minutes under the conditions of vacuum pressure of 0.4 MPa, temperature of 25-45° C., and stirring speed of 200-300 rpm. In this way, the particle size of the disinfection composition can be significantly reduced, and the particle size range of the disinfectant composition is narrowed advantageously, so that the particle size distribution of the disinfection composition is narrow and uniform, and the dispersion and stability of the prepared emulsion are good. The microemulsion with small particle size, due to its small size effect and volume effect, improves the electro-adsorption (van der Waals force) and permeability of the disinfectant, which helps to enhance the disinfection effect.

DETAILED DESCRIPTION OF EMBODIMENTS

The following examples are provided for a better understanding of the present invention, and are not limited to the best embodiment, and do not constitute a limitation for the content and protection scope of the present invention. Any product identical or similar to that of the present invention, obtained by anyone combining the present invention with the features of other prior art or obtained by anyone under the teaching of the present invention, falls within the protection scope of the present invention.

Unless otherwise specified, experimental steps or conditions in the examples are carried out according to conventional experimental steps or conditions as described in documents in the field. Unless otherwise specified, reagents or instruments used without the manufacturer's indication are all conventional reagent products that are commercially available.

Wherein, anhydrous ethanol, 1,2-propylene glycol, polyoxyethylene 40 hydrogenated castor oil and polyoxyethylene 60 hydrogenated castor oil all meet the requirements of medicinal excipients of Chinese Pharmacopoeia (2020 edition of four) and are all pharmaceutical grade. Azelaic acid meets the USP32 standard, the content is 95%, and the grade is cosmetic grade. Citric acid meets the GB/T9855-2008 standard, the content is 99%, and the grade is analytically pure. Phytic acid meets the GB1886.237-2016 standard, the content is 90%, and the grade is analytically pure. All the above raw materials are all commercially available.

Tea tree essential oil was purchased from Guangxi Nanning Chengchun Botanical Development Co., Ltd., the content is 99%, and the grade is cosmetic grade.

Niaouli essential oil, palmarosa essential oil, lemon mint essential oil, lemon myrtle essential oil and *melaleuca* essential oil were purchased from Puli Aromatic Pharmaceutical Technology (Shanghai) Co., Ltd., each with a content of 99% and a cosmetic grade. *Litsea cubeba* essential oil (food grade), lemongrass essential oil (cosmetic grade) and bitter orange leaf (cosmetic grade) were all purchased from Jiangxi Ji' an Zhongxiang Natural Plant Co., Ltd., and the content was 99% for each.

Example 1

Provided is a disinfection composition which has a formulation as shown in Table 1:

TABLE 1

| \multicolumn{2}{c}{Formulation of disinfection composition} ||
| Components | Dosage/kg |
| --- | --- |
| tea tree essential oil | 0.6 |
| niaouli essential oil | 0.5 |
| palmarosa essential oil | 0.5 |
| lemon mint essential oil | 0.2 |
| litsea cubeba essential oil | 0.5 |
| azelaic acid | 0.5 |
| polyethylene glycol 40 hydrogenated castor oil | 4.3 |
| absolute ethanol | 30 |
| 1,2-propanediol | 4 |
| citric acid | 0.05 |
| phytic acid | 0.05 |
| water | 58.8 |

The disinfection composition provided in this example is prepared by a method comprising the following steps:

1. A Pre-Mixing Step:

(1) Tea tree essential oil, niaouli essential oil, palmarola essential oil, lemon mint essential oil, and *Litsea cubeba* essential oil are mixed according to the amount of formulation, stirred well and heated to 40° C. under stirring to obtain a disinfection essential oil.

(2) Citric acid, phytic acid and water are mixed according to the amount of formulation, stirred well and heated to 40° C. under stirring to obtain a first premixture.

(3) Polyethylene glycol 40 hydrogenated castor oil and 1,2-propylene glycol are mixed according to the amount of formulation, stirred well and heated to 40° C. under stirring to obtain a surfactant.

(4) Absolute ethanol and azalea acid are mixed according to the amount of formulation, stirred well and heated to 40° C. under stirring to obtain an alcohol solution containing azalea acid for later use.

2. A Total Mixing Step:

(1) A vacuum reactor is evacuated to a vacuum pressure of 0.2 MPa and is maintained at 40° C. The surfactant, the first premixture, and the alcohol solution containing azalea acid are successively mixed with the disinfection essential oil. Specifically, the disinfection essential oil and the surfactant are first pumped into the vacuum reactor, and stirred at a stirring speed of 80 rpm for 10 minutes to prepare a first mixture; then the first premixture is slowly pumped into the first mixture at a stirring speed of 80 rpm and is further stirred for 10 minutes to obtain a second mixture; and then the alcohol solution containing azalea acid was pumped into the second mixture at a stirring speed of 80 rpm to prepare a third mixture.

(2) The vacuum reactor is evacuated to a vacuum pressure of 0.4 MPa and maintained at 40° C., and stirring is continued for 10 minutes at a stirring speed of 250 rpm, then the pressure is relieved and the temperature is lowered to 25° C., and the resulted mixture is passed through a 0.25 μm filter membrane to remove impurities and bacteria, obtaining a disinfection composition.

The appearance and pH of the above-mentioned disinfection composition are tested, and the appearance is clear and transparent, and the pH is between 2.5 and 4.5, which meet the product standards of the enterprise.

Example 2

Provided is a disinfection composition which has a formulation as shown in Table 2:

TABLE 2

| \multicolumn{2}{c}{Formulation of disinfection composition} ||
| Components | Dosage/kg |
| --- | --- |
| tea tree essential oil | 0.5 |
| niaouli essential oil | 0.3 |
| palmarosa essential oil | 0.3 |
| lemon mint essential oil | 0.5 |
| litsea cubeba essential oil | 0.7 |
| azelaic acid | 0.5 |
| polyethylene glycol 40 hydrogenated castor oil | 3.2 |
| absolute ethanol | 30 |
| 1,2-propanediol | 4 |
| citric acid | 0.05 |
| phytic acid | 0.05 |
| water | 60.4 |

The disinfection composition provided in this example is prepared by the same method as described in Example 1.

The appearance and pH of the above-mentioned disinfection composition are tested, and the appearance is clear and transparent, and the pH is between 2.5 and 4.5, which meet the product standards of the enterprise.

Example 3

Provided is a disinfection composition which has a formulation as shown in Table 3:

TABLE 3

| \multicolumn{2}{c}{Formulation of disinfection composition} ||
| Components | Dosage/kg |
| --- | --- |
| tea tree essential oil | 0.7 |
| niaouli essential oil | 0.5 |
| palmarosa essential oil | 0.5 |
| lemon mint essential oil | 0.3 |
| litsea cubeba essential oil | 0.4 |
| azelaic acid | 0.5 |
| polyethylene glycol 40 hydrogenated castor oil | 4.8 |
| absolute ethanol | 30 |
| 1,2-propanediol | 4 |
| citric acid | 0.05 |
| phytic acid | 0.05 |
| water | 58.2 |

The disinfection composition provided in this example is prepared by the same method as described in Example 1.

The appearance and pH of the above-mentioned disinfection composition are tested, and the appearance is clear and transparent, and the pH is between 2.5 and 4.5, which meet the product standards of the enterprise.

Example 4

Provided is a disinfection composition which has a formulation as shown in Table 4:

TABLE 4

| Formulation of disinfection composition | |
| --- | --- |
| Components | Dosage/kg |
| tea tree essential oil | 0.5 |
| niaouli essential oil | 0.5 |
| palmarosa essential oil | 0.5 |
| lemon mint essential oil | 0.2 |
| litsea cubeba essential oil | 0.5 |
| azelaic acid | 0.5 |
| polyethylene glycol 40 hydrogenated castor oil | 4.6 |
| absolute ethanol | 30 |
| 1,2-propanediol | 4 |
| citric acid | 0.05 |
| phytic acid | 0.05 |
| water | 58.6 |

The disinfection composition provided in this example is prepared by the same method as described in Example 1.

The appearance and pH of the above-mentioned disinfection composition are tested, and the appearance is clear and transparent, and the pH is between 2.5 and 4.5, which meet the product standards of the enterprise.

Example 5

Provided is a disinfection composition which has a formulation as shown in Table 5:

TABLE 5

| Formulation of disinfection composition | |
| --- | --- |
| Components | Dosage/kg |
| tea tree essential oil | 0.6 |
| niaouli essential oil | 0.5 |
| palmarosa essential oil | 0.5 |
| lemon mint essential oil | 0.2 |
| litsea cubeba essential oil | 0.5 |
| azelaic acid | 0.5 |
| polyethylene glycol 40 hydrogenated castor oil | 4.3 |
| absolute ethanol | 30 |
| 1,2-propanediol | 4 |
| citric acid | 0.05 |
| phytic acid | 0.05 |
| water | 58.8 |

The disinfection composition provided in this example is prepared by the same method as described in Example 1, except that the temperature in steps (1) and (2) of the total mixing in this example are both 30° C.; other steps and parameter conditions are the same as those in Example 1.

The appearance and pH of the above-mentioned disinfection composition are tested, and the appearance is clear and transparent, and the pH is between 2.5 and 4.5, which meet the product standards of the enterprise.

Example 6

Provided is a disinfection composition which has a formulation as shown in Table 6:

TABLE 6

| Formulation of disinfection composition | |
| --- | --- |
| Components | Dosage/kg |
| tea tree essential oil | 0.6 |
| niaouli essential oil | 0.5 |
| palmarosa essential oil | 0.5 |
| lemon mint essential oil | 0.2 |
| litsea cubeba essential oil | 0.5 |
| azelaic acid | 0.5 |
| polyethylene glycol 40 hydrogenated castor oil | 4.3 |
| absolute ethanol | 30 |
| 1,2-propanediol | 4 |
| citric acid | 0.05 |
| phytic acid | 0.05 |
| water | 58.8 |

The disinfection composition provided in this example is prepared by the same method as described in Example 1, except that the vacuum pressure in step (2) of the total mixing step in this example are 0.5 MPa; other steps and parameter conditions are the same as those in Example 1.

The appearance and pH of the above-mentioned disinfection composition are tested, and the appearance is clear and transparent, and the pH is between 2.5 and 4.5, which meet the product standards of the enterprise.

Example 7

Provided is a disinfection composition which has a formulation as shown in Table:

TABLE 7

| Formulation of disinfection composition | |
| --- | --- |
| Components | Dosage/kg |
| tea tree essential oil | 0.6 |
| niaouli essential oil | 0.5 |
| palmarosa essential oil | 0.5 |
| lemon mint essential oil | 0.2 |
| litsea cubeba essential oil | 0.5 |
| azelaic acid | 0.5 |
| polyethylene glycol 40 hydrogenated castor oil | 4.3 |
| absolute ethanol | 30 |
| 1,2-propanediol | 4 |
| citric acid | 0.05 |
| phytic acid | 0.05 |
| water | 58.8 |

The disinfection composition provided in this example is prepared by the same method as described in Example 1, except that the stirring speed in step (1) of the total mixing step in this example is 150 rpm; other steps and parameter conditions are the same as those in Example 1.

The appearance and pH of the above-mentioned disinfection composition are tested, and the appearance is clear and transparent, and the pH is between 2.5 and 4.5, which meets the product standards of the enterprise.

Example 8

Provided is a disinfection composition which has a formulation as shown in Table 8:

TABLE 8

| Formulation of disinfection composition | |
| --- | --- |
| Components | Dosage/kg |
| tea tree essential oil | 0.6 |
| niaouli essential oil | 0.5 |
| palmarosa essential oil | 0.5 |
| lemon mint essential oil | 0.2 |
| *litsea cubeba* essential oil | 0.5 |
| azelaic acid | 0.5 |
| polyethylene glycol 40 hydrogenated castor oil | 4.3 |
| absolute ethanol | 30 |
| 1,2-propanediol | 4 |
| citric acid | 0.05 |
| phytic acid | 0.05 |
| water | 58.8 |

The disinfection composition provided in this example is prepared by a method comprising the following steps:

(1) Tea tree essential oil, niaouli essential oil, palmarola essential oil, lemon mint essential oil, and *Litsea cubeba* essential oil are mixed according to the amount of formulation, and stirred for 20 min to obtain a disinfection essential oil, which stands for later use.

(2) Azalea acid is weighed out according to the formulation and dissolved in 5 kg absolute ethanol to obtain an alcohol solution containing azalea acid, which stands for later use.

(3) Polyethylene glycol 40 hydrogenated castor oil and 1,2-propylene glycol are mixed according to the amount of formulation to obtain a surfactant.

(4) Citric acid, phytic acid and water are mixed according to the amount of formulation, stirred for 20 min to obtain a first premixture.

(5) The disinfection essential oil and the surfactant are mixed, and stirred for 20 min at 80 rpm to obtain a first mixture.

(6) The first premixture is added slowly into the first mixture, and stirred for 20 min at 80 rpm to obtain a second mixture.

(7) The alcohol solution containing azalea acid and the second mixture are mixed and stirred for 20 min at 80 rpm to obtain a third mixture.

(8) The remaining ethanol is mixed with the third mixture under stirring at 80 rpm, and the stirring is not stopped until the mixed solution is transparent. After standing, the solution is pumped into a microfilter to carry out filtration, and the filtrate is collected to obtain a disinfection composition.

The appearance and pH of the above-mentioned disinfection composition are tested, and the appearance is clear and transparent, and the pH is between 2.5 and 4.5, which meet the product standards of the enterprise.

Example 9

Provided is a disinfection composition which has a formulation as shown in Table 9:

TABLE 9

| Formulation of disinfection composition | |
| --- | --- |
| Components | Dosage/kg |
| tea tree essential oil | 1.0 |
| niaouli essential oil | 0.5 |
| palmarosa essential oil | 1.0 |
| lemon mint essential oil | 0.5 |
| *litsea cubeba* essential oil | 0.8 |
| azelaic acid | 0.5 |
| polyethylene glycol 40 hydrogenated castor oil | 4.5 |
| absolute ethanol | 25 |
| 1,2-propanediol | 4 |
| citric acid | 0.05 |
| phytic acid | 0.05 |
| water | 62.1 |

The disinfection composition provided in this example is prepared by the same method as described in Example 1.

The appearance and pH of the above-mentioned disinfection composition are tested, and the appearance is clear and transparent, and the pH is between 2.5 and 4.5, which meet the product standards of the enterprise.

Example 10

Provided is a disinfection composition which has a formulation as shown in Table 10:

TABLE 10

| Formulation of disinfection composition | |
| --- | --- |
| Components | Dosage/kg |
| tea tree essential oil | 0.6 |
| niaouli essential oil | 0.5 |
| palmarosa essential oil | 0.5 |
| lemon mint essential oil | 0.2 |
| *litsea cubeba* essential oil | 0.5 |
| azelaic acid | 0.5 |
| polyethylene glycol 60 hydrogenated castor oil | 4.3 |
| absolute ethanol | 30 |
| 1,2-propanediol | 4 |
| citric acid | 0.05 |
| phytic acid | 0.05 |
| water | 58.8 |

The disinfection composition provided in this example is prepared by the same method as described in Example 1, Except that polyethylene glycol 40 hydrogenated castor oil is replaced with polyethylene glycol 60 hydrogenated castor oil.

The appearance and pH of the above-mentioned disinfection composition are tested, and the appearance is clear and transparent, and the pH is between 2.5 and 4.5, which meet the product standards of the enterprise.

Comparative Example 1

Provided is a disinfection composition which has a formulation as shown in Table 11:

TABLE 11

| Formulation of disinfection composition | |
| --- | --- |
| Components | Dosage/kg |
| tea tree essential oil | 0.6 |
| niaouli essential oil | 0.5 |
| palmarosa essential oil | 0.5 |
| lemon mint essential oil | 0.2 |
| litsea cubeba essential oil | 0.5 |
| azelaic acid | 0.5 |
| Tween 80 | 4.3 |
| absolute ethanol | 30 |
| 1,2-propanediol | 4 |
| EDTA disodium salt | 0.05 |
| water | 58.8 |

The disinfection composition provided in this comparative example is prepared by a method comprising the following steps:

1. A Pre-Mixing Step:

(1) Tea tree essential oil, niaouli essential oil, palmarola essential oil, lemon mint essential oil, and *Litsea cubeba* essential oil are mixed according to the amount of formulation, stirred well and heated to 40° C. under stirring to obtain a disinfection essential oil.

(2) Tween 80 and 1,2-propylene glycol are mixed according to the formulation, stirred well and heated to 40° C. under stirring to obtain a surfactant.

(3) Absolute ethanol and azelea acid are mixed according to the formulation, stirred well and heated to 40° C. under stirring to obtain an alcohol solution containing azalea acid for later use.

2. A Total Mixing Step:

(1) A vacuum reactor is evacuated to a vacuum pressure of 0.2 MPa and is maintained at 40° C. The surfactant, water, EDTA disodium salt, and the alcohol solution containing azalea acid are successively mixed with the disinfection essential oil. Specifically, the disinfection essential oil and the surfactant are first pumped into the vacuum reactor, and stirred at a stirring speed of 80 rpm for 10 minutes to prepare a first mixture; then water is slowly pumped into the first mixture at a stirring speed of 80 rpm, and then EDTA disodium salt is added, and stirring is continued for 10 minutes to obtain a second mixture; and then the alcohol solution containing azalea acid was pumped into the second mixture at a stirring speed of 80 rpm to prepare a third mixture.

(2) The vacuum reactor is evacuated to a vacuum pressure of 0.4 MPa and maintained at 40° C., and stirring is continued for 10 minutes at a stirring speed of 250 rpm, then the pressure is relieved and the temperature is lowered to 25° C., and the resulted mixture is passed through a 0.25 μm filter membrane to remove impurities and bacteria, obtaining a disinfection composition.

Comparative Example 2

Provided is a disinfection composition which has a formulation as shown in Table 12:

TABLE 12

| Formulation of disinfection composition | |
| --- | --- |
| Components | Dosage/kg |
| tea tree essential oil | 0.6 |
| niaouli essential oil | 0.5 |
| palmarosa essential oil | 0.5 |
| lemon mint essential oil | 0.2 |
| litsea cubeba essential oil | 0.5 |
| azelaic acid | 0.5 |
| polyethylene glycol 40 hydrogenated castor oil | 4.3 |
| absolute ethanol | 0 |
| 1,2-propanediol | 4 |
| citric acid | 0.05 |
| phytic acid | 0.05 |
| water | 58.8 |

The disinfection composition provided in this example is prepared by the same method as described in Example 1, except that in the premixing step of this comparative example there is no step (4), and step (2) is carried out by mixing citric acid, phytic acid, azaleaic acid and water according to the formulation, stirring well, and heating to 40° C. under stirring to obtain a first premixture.

In addition, in the total mixing step, step (1) is carried out as follows:

A vacuum reactor is evacuated to a vacuum pressure of 0.2 MPa and is maintained at 40° C. The surfactant and the first premixture are successively mixed with the disinfection essential oil. Specifically, the disinfection essential oil and the surfactant are first pumped into the vacuum reactor, and stirred at a stirring speed of 80 rpm for 10 minutes to prepare a first mixture; the first premixture is slowly pumped into the first mixture at a stirring speed of 80 rpm, and stirring is continued for 10 minutes to obtain a second mixture. Other steps and parameter conditions are the same as that of Example 1.

Comparative Example 3

Provided is a disinfection composition which has a formulation as shown in Table 13:

TABLE 13

| Formulation of disinfection composition | |
| --- | --- |
| Components | Dosage/kg |
| tea tree essential oil | 0.6 |
| niaouli essential oil | 0.5 |
| palmarosa essential oil | 0.5 |
| lemon mint essential oil | 0.2 |
| litsea cubeba essential oil | 0.5 |
| azelaic acid | 0.5 |
| polyethylene glycol 40 hydrogenated castor oil | 4.3 |
| absolute ethanol | 30 |
| 1,2-propanediol | 4 |
| citric acid | 0 |
| phytic acid | 0.05 |
| water | 58.8 |

The disinfection composition provided in this example is prepared by the same method as described in Example 1, except that in the premixing step of this example, the step (2) is carried out as follows:

phytic acid and water are mixed according to the formulation, stirred well, and heated to 40° C. under stirring to obtain a first premixture. Other steps and parameter conditions are the same as that of Example 1.

Experimental Example 1 Bacterial Propagules

1. Experimental Materials and Reagents (1) Experimental strains: *Escherichia coli* (8099) fifth generation, *Pseudomonas aeruginosa* (ATCC 15442) fifth generation, and *Staphylococcus aureus* (ATCC 6538) fifth generation, provided by the Chinese Microorganism Collection Management Committee Microbiology Center.

(2) Organic interference substance: 30 g/L bovine serum albumin.

(3) Test samples: Disinfection compositions of different formulations prepared in the Examples 1-10 and Comparative Examples 1-3. The disinfection compositions as prepared were directly used for the test without dilution.

(4) Neutralizer: D/E neutralizing broth containing 2 g/L histidine, 20 g/L soap base, 80 g/L lecithin and 100 g/L Tween 80.

(5) Medium: Nutrient Agar (Beijing Luqiao Technology Co., Ltd.).

2. Experimental Method (1) Preparation of bacterial suspensions: a bacterial suspension for the test with a concentration of $1\times10^8$ cfu/ml-$5\times10^8$ cfu/ml is prepared with tryptone saline solution (TPS) by referring to "*Technical Standard for Disinfection*" (2002 Edition) 2.1.1.2.

(2) Neutralizer identification test: The test is conducted according to "*Technical Standard for Disinfection*" (2002 Edition) 2.1.1.5, using *Escherichia coli* (8099) as test strains, at a water bath temperature of 20±1° C., and the test is repeated 3 times.

(3) Quantitative sterilization test:

The test is carried out in a water bath at 20±1° C. Before the test, each bacterial suspension and each disinfection composition solution as prepared without dilution are kept at a constant temperature for more than 5 minutes. 0.5 mL bacterial suspension for the test is added into a large sterile test tube, and then 0.5 mL organic interference substance (30 g/L bovine serum albumin) is added into the large sterile test tube. The large sterile test tube is placed in a water bath at 20±1° C. for 5 min. 4.0 mL of each disinfection composition solution is injected into a such prepared large sterile test tube by a sterile pipette, so that the disinfection composition solution is quickly mixed well with the bacteria suspension in the large sterile test tube. Samples at action for 0.5 min, 1 min and 1.5 min are collected, with each sample 0.5 mL, and are respectively added to a test tube containing 4.5 mL of neutralizer to carry out neutralization for 10 min. 1.0 mL of each neutralized sample solution is collected to determine the number of viable bacteria in accordance with the viable count method (pour method). At the same time, an equal volume of tryptone saline solution (TPS) is used instead of the disinfection composition to conduct parallel tests as a positive control. All neutralized samples are cultured in a 37° C. incubator for 48 hours, and then the concentration (cfu/mL) of viable bacteria in each sample is calculated and converted to a logarithmic value. The test for each disinfection composition is repeated 3 times. Then an average killing logarithmic value is calculated as follows: Average killing logarithmic value=logarithmic value of an average viable bacteria concentration of the positive control—logarithmic value of an average viable bacteria concentration of a test sample.

3. Test Results (1) Results of the Neutralizer Identification Test

The results of the neutralizer identification test meet the requirements of 2.1.1.5.7 of "*Technical Standard for Disinfection*" (2002 Edition), indicating that the neutralizer can neutralize the effects of active ingredients in the disinfection compositions on *Escherichia coli*. The neutralized product has no effect on *Escherichia coli* and culture medium.

(2) Results of the Quantitative Sterilization Test

1) Killing Results of *Staphylococcus aureus*

For different bacterial species to be killed, the required killing logarithmic values for a qualified disinfection are different. A qualified disinfection for *Staphylococcus aureus* requires a killing log value of ≥5.0.

According to the experimental results in the following table, it can be seen that compared with the Comparative Examples 1-3, the disinfection compositions of Examples 1-10 of the present invention take shorter time to reach a qualified disinfection level, indicating that the disinfection compositions of the present invention have better killing effects than the compositions of Comparative Examples 1-3. A qualified disinfection level can be reached within 0.5 min by all of the disinfection compositions of the present invention, and complete killing is realized at 1.5 min.

TABLE 14

| | Killing results for *Staphylococcus aureus* | | | |
|---|---|---|---|---|
| | Logarithmic value of an average viable bacteria concentration of | Average killing logarithmic value at different action time | | |
| Test samples | the positive control | 0.5 min | 1 min | 1.5 min |
| Example 1 | 7.56 | 5.35 | 6.97 | >7.56 |
| Example 2 | 7.58 | 5.29 | 6.93 | >7.58 |
| Example 3 | 7.53 | 5.30 | 6.96 | >7.53 |
| Example 4 | 7.48 | 5.28 | 6.95 | >7.48 |
| Example 5 | 7.26 | 5.26 | 6.90 | >7.26 |
| Example 6 | 7.41 | 5.27 | 6.89 | >7.41 |
| Example 7 | 7.52 | 5.25 | 6.88 | >7.52 |
| Example 8 | 7.35 | 5.18 | 6.85 | >7.35 |
| Example 9 | 7.50 | 5.20 | 6.86 | >7.50 |
| Example 10 | 7.48 | 5.24 | 6.89 | >7.48 |
| Comparative Example 1 | 7.33 | 3.61 | 5.25 | 6.87 |
| Comparative Example 2 | 7.30 | 1.96 | 3.54 | 5.10 |
| Comparative Example 3 | 7.26 | 3.64 | 5.28 | 6.89 |

2) Killing Results of *Escherichia coli*

A qualified disinfection for *Escherichia coli* requires a killing log value of ≥5.0. According to the experimental results in the following table, it can be seen that compared with the Comparative Examples 1-3, the disinfection compositions prepared in Examples 1-10 of the present invention take shorter time to reach a qualified disinfection level for *Escherichia coli*, indicating that the killing effects of the disinfection compositions of the present invention are obviously better than the compositions of Comparative Examples 1-3. Complete killing is realized at 1.5 min.

TABLE 15

Killing results for *Escherichia coli*

| Test samples | Logarithmic value of an average viable bacteria concentration of the positive control | Average killing logarithmic value at different action time | | |
|---|---|---|---|---|
| | | 0.5 min | 1 min | 1.5 min |
| Example 1 | 7.44 | 7.44 | >7.44 | >7.44 |
| Example 2 | 7.42 | 7.42 | >7.42 | >7.42 |
| Example 3 | 7.38 | 7.38 | >7.38 | >7.38 |
| Example 4 | 7.40 | 7.40 | >7.40 | >7.40 |
| Example 5 | 7.36 | 7.36 | >7.36 | >7.36 |
| Example 6 | 7.31 | 7.31 | >7.31 | >7.31 |
| Example 7 | 7.29 | 7.29 | >7.29 | >7.29 |
| Example 8 | 7.34 | 7.34 | >7.34 | >7.34 |
| Example 9 | 7.20 | 7.20 | >7.20 | >7.20 |
| Example 10 | 7.33 | 7.33 | >7.33 | >7.33 |
| Comparative Example 1 | 7.26 | 3.65 | 5.26 | 6.85 |
| Comparative Example 2 | 7.40 | 1.86 | 3.41 | 5.00 |
| Comparative Example 3 | 7.37 | 3.68 | 5.27 | 6.87 |

3) Killing Results of *Pseudomonas aeruginosa*

A qualified disinfection for *Pseudomonas aeruginosa* requires a killing log value of ≥5.0. According to the experimental results in the following table, it can be seen that the disinfection compositions prepared in Examples 1-10 of the present invention have a killing rate of 100% against *Pseudomonas aeruginosa*, and the time to reach a qualified disinfection level is shorter than the compositions of Comparative Examples 1-3, indicating the killing effects of the disinfection compositions of the present invention are obviously better than that of Comparative Examples 1-3. Complete killing is realized at 0.5 min.

TABLE 16

Killing results for *Pseudomonas aeruginosa*

| Test samples | Logarithmic value of an average viable bacteria concentration of the positive control | Average killing logarithmic value at different action time | | |
|---|---|---|---|---|
| | | 0.5 min | 1 min | 1.5 min |
| Example 1 | 7.61 | >7.61 | >7.61 | >7.61 |
| Example 2 | 7.57 | >7.57 | >7.57 | >7.57 |
| Example 3 | 7.59 | >7.59 | >7.59 | >7.59 |
| Example 4 | 7.60 | >7.60 | >7.60 | >7.60 |
| Example 5 | 7.53 | >7.53 | >7.53 | >7.53 |
| Example 6 | 7.42 | >7.42 | >7.42 | >7.42 |
| Example 7 | 7.51 | >7.51 | >7.51 | >7.51 |
| Example 8 | 7.58 | >7.58 | >7.58 | >7.58 |
| Example 9 | 7.52 | >7.52 | >7.52 | >7.52 |
| Example 10 | 7.49 | >7.49 | >7.49 | >7.49 |
| Comparative Example 1 | 7.50 | 5.49 | 7.10 | 7.50 |
| Comparative Example 2 | 7.56 | 3.10 | 4.65 | 6.34 |
| Comparative Example 3 | 7.54 | 6.15 | 7.32 | 7.54 |

Experimental Example 2 *Candida albicans*

1. Experimental Materials and Reagents (1) Experimental strains: *Candida albicans* (ATCC10231) fifth generation, provided by the Chinese Microorganism Collection Management Committee Microbiology Center.

(2) Organic interference substance: 30 g/L bovine serum albumin.

(3) Test samples: Disinfection compositions of different formulations prepared in Examples 1-10 and Comparative Examples 1-3. The disinfection compositions as prepared were directly used for the test without dilution.

(4) Neutralizer: D/E neutralizing broth containing 2 g/L histidine, 20 g/L soap base, 80 g/L lecithin, and 100 g/L Tween 80.

(5) Medium: Sabouraud medium (Beijing Luqiao Technology Co., Ltd.).

2. Experimental Method (1) Preparation of bacterial suspensions: bacterial suspensions for the test with a concentration of $1\times10^7$ cfu/ml-$5\times10^7$ cfu/ml is prepared with tryptone saline solution (TPS) by referring to "Technical Standard for Disinfection" (2002) 2.1.1.9.3.

(2) Neutralizer identification test: The test is conducted according to "Technical Standard for Disinfection" (2002 Edition) 2.1.1.5, using *Candida albicans* as test strains, at a water bath temperature of 20±1° C., and the test is repeated 3 times.

(3) Quantitative sterilization test:

The test is carried out in a water bath at 20±1° C. Before the test, each bacterial suspension and each disinfection composition solution as prepared without dilution are kept at a constant temperature for more than 5 minutes. 0.5 mL bacterial suspension for the test is added into a large sterile test tube, and then 0.5 mL organic interference substance (30 g/L bovine serum albumin) is added into the large sterile test tube. The large sterile test tube is placed in a water bath at 20±1° C. for 5 min. 4.0 mL of each disinfection composition solution is injected into a such prepared large sterile test tube by a sterile pipette, so that the disinfection composition solution is quickly mixed well with the bacteria suspension in the large sterile test tube. Samples at action for 0.5 min, 1 min and 1.5 min are collected, with each sample 0.5 mL, and are respectively added to a test tube containing 4.5 mL of neutralizer to carry out neutralization for 10 min. 1.0 mL of each neutralized sample solution is collected to determine the number of viable bacteria in accordance with the viable count method (pour method). At the same time, an equal volume of tryptone saline solution (TPS) is used instead of the disinfection composition to conduct parallel tests as a positive control. All neutralized samples are cultured in a 37° C. incubator for 72 hours, and then the concentration (cfu/mL) of viable bacteria in each sample is calculated and converted to a logarithmic value (N). The test for each disinfection composition is repeated 3 times. Then an average killing logarithmic value is calculated as follows:

Average killing logarithmic value=logarithmic value of an average viable bacteria concentration of the positive control (No)−logarithmic value of an average viable bacteria concentration of a test sample (Nx).

3. Test Results (1) Results of the neutralizer identification test

The results of the neutralizer identification test meet the requirements of 2.1.1.5.7 of "Technical Standard for Disinfection" (2002), indicating that the neutralizer can neutralize the effects of active ingredients in the disinfection compositions on *Candida albicans*. The neutralized product has no effect on *Candida albicans* and culture medium.

(2) Results of the Quantitative Sterilization Test

For different bacterial species to be killed, the required killing logarithmic values for a qualified disinfection are different. A qualified disinfection for *Candida albicans* (fungi) requires a killing log value of ≥4.0.

According to the experimental results in the following table, it can be seen that compared with the Comparative Examples 1-3, the disinfection compositions of Examples 1-10 of the present invention take shorter time to reach a qualified disinfection level, indicating that the disinfection compositions of the present invention have obviously better killing effects than the compositions of Comparative Example 1-3. Compared with Examples 5-7, the sterilization and disinfection effect of Example 1 of the present invention is further improved by optimizing the process conditions.

TABLE 17

Killing results for *Candida albicans*

| Test samples | Logarithmic value of an average viable bacteria concentration of the positive control | Average killing logarithmic value at different action time | | |
|---|---|---|---|---|
| | | 0.5 min | 1 min | 1.5 min |
| Example 1 | 6.32 | 4.26 | 5.05 | 5.97 |
| Example 2 | 6.23 | 4.25 | 5.03 | 5.96 |
| Example 3 | 6.29 | 4.20 | 5.01 | 5.92 |
| Example 4 | 6.26 | 4.18 | 4.98 | 5.91 |
| Example 5 | 6.31 | 4.14 | 4.91 | 5.85 |
| Example 6 | 6.25 | 4.15 | 4.95 | 5.87 |
| Example 7 | 6.21 | 4.11 | 4.88 | 5.83 |
| Example 8 | 6.34 | 4.08 | 4.85 | 5.74 |
| Example 9 | 6.27 | 4.10 | 4.89 | 5.78 |
| Example 10 | 6.35 | 4.13 | 4.90 | 5.86 |
| Comparative Example 1 | 6.24 | 2.53 | 3.32 | 4.23 |
| Comparative Example 2 | 6.30 | 1.76 | 2.54 | 3.46 |
| Comparative Example 3 | 6.33 | 3.17 | 3.96 | 4.87 |

Experimental Example 3 Mycobacteria

1. Experimental Materials and Reagents (1) Experimental strains: *Mycobacterium chelonae* subspecies *abscessus* (ATCC 93326) fourth generation, provided by the Chinese Microorganism Collection Management Committee Microbiology Center.

(2) Organic interference substance: 30 g/L bovine serum albumin.

(3) Test samples: Disinfection compositions of different formulation prepared in Examples 1-10 and Comparative Examples 1-3. The disinfection compositions as prepared were directly used for the test without dilution.

(4) Neutralizer: D/E neutralizing broth containing 2 g/L histidine, 20 g/L soap base, 80 g/L lecithin, and 100 g/L Tween 80.

(5) Medium: *Mycobacterium* culture medium (Beijing Luqiao Technology Co., Ltd.).

2. Experimental Method (1) Preparation of bacterial suspensions: a bacterial suspension for the test with a concentration of 1×10$^8$cfu/ml-5×10$^8$cfu/ml is prepared with tryptone saline solution (TPS) by referring to "Technical Standard for Disinfection" (2002) 2.1.1.2.3.

(2) Neutralizer identification test: The test is conducted according to "Technical Standard for Disinfection" (2002 Edition) 2.1.1.5, using *Mycobacterium chelonae* subspecies *abscessus* as test strains, at a water bath temperature of 20±1° C., and the test is repeated 3 times.

(3) Quantitative sterilization test:

The test is carried out in a water bath at 20±1° C. Before the test, each bacterial suspension and each disinfection composition solution as prepared without dilution are kept at a constant temperature for more than 5 minutes. 0.5 mL bacterial suspension for the test is added into a large sterile test tube, and then 0.5 mL organic interference substance (30 g/L bovine serum albumin) is added into the large sterile test tube. The large sterile test tube is placed in a water bath at 20±1° C. for 5 min. 4.0 mL of each disinfection composition solution is injected into a such prepared large sterile test tube by a sterile pipette, so that the disinfection composition solution is quickly mixed well with the bacteria suspension in the large sterile test tube. Samples at action for 0.5 min, 1 min and 1.5 min are collected, with each sample 0.5 mL, and are respectively added to a test tube containing 4.5 mL of neutralizer to carry out neutralization for 10 min. 1.0 mL of each neutralized sample solution is collected to determine the number of viable bacteria by inoculating the mycobacterial medium plate according to the plate coating method. At the same time, an equal volume of tryptone saline solution (TPS) is used instead of the disinfection composition to conduct parallel tests as a positive control. All neutralized samples are cultured in a 37° C. incubator for 1 week, and then the concentration (cfu/mL) of viable bacteria in each sample is calculated and converted to a logarithmic value. The test for each disinfection composition is repeated 3 times. Then an average killing logarithmic value is calculated as follows:

Average killing logarithmic value=logarithmic value of an average viable bacteria concentration of the positive control (No)−logarithmic value of an average viable bacteria concentration of a test sample (Nx).

3. Test Results (1) Results of the Neutralizer Identification Test

The results of the neutralizer identification test meet the requirements of 2.1.1.5.7 of "Technical Standard for Disinfection" (2002), indicating that the neutralizer can neutralize the effects of active ingredients in the disinfection compositions on *Mycobacterium chelonae* subspecies abscess. The neutralized product has no effect on *Mycobacterium chelonae* subspecies abscess and culture medium.

(2) Results of Killing Test

For different bacterial species to be killed, the required killing logarithmic values for a qualified disinfection are different. A qualified disinfection for *Mycobacterium chelonae* subspecies abscess requires a killing log value of ≥4.0.

According to the experimental results in the following table, it can be seen that compared with the Comparative Examples 1-3, the disinfection compositions of Examples 1-10 of the present invention take shorter time to reach a qualified disinfection level, indicating that the disinfection compositiond of the present invention have obviously better killing effects than the compositions of Comparative Example 1-3. Complete killing is realized at 0.5 min.

TABLE 18

Killing results for *Mycobacterium chelonae* subspecies abscessus

| Test samples | Logarithmic value of an average viable bacteria concentration of the positive control | Average killing logarithmic value at different action time | | |
|---|---|---|---|---|
| | | 0.5 min | 1 min | 1.5 min |
| Example 1 | 7.34 | >7.34 | >7.34 | >7.34 |
| Example 2 | 7.32 | >7.32 | >7.32 | >7.32 |
| Example 3 | 7.30 | >7.30 | >7.30 | >7.30 |

TABLE 18-continued

Killing results for *Mycobacterium chelonae* subspecies abscessus

| Test samples | Logarithmic value of an average viable bacteria concentration of the positive control | Average killing logarithmic value at different action time | | |
|---|---|---|---|---|
| | | 0.5 min | 1 min | 1.5 min |
| Example 4 | 7.38 | >7.38 | >7.38 | >7.38 |
| Example 5 | 7.46 | >7.46 | >7.46 | >7.46 |
| Example 6 | 7.37 | >7.37 | >7.37 | >7.37 |
| Example 7 | 7.44 | >7.44 | >7.44 | >7.44 |
| Example 8 | 7.33 | >7.33 | >7.33 | >7.33 |
| Example 9 | 7.40 | >7.40 | >7.40 | >7.40 |
| Example 10 | 7.29 | >7.29 | >7.29 | >7.29 |
| Comparative Example 1 | 7.33 | 3.32 | 4.12 | 5.84 |
| Comparative Example 2 | 7.42 | 2.41 | 3.24 | 4.06 |
| Comparative Example 3 | 7.31 | 3.98 | 4.96 | 6.15 |

Experimental Example 4 Study on the Interaction Between Ethanol and Citric Acid

1. Experimental Materials and Reagents (1) Experimental strain: *Staphylococcus aureus* (ATCC6538) fifth generation, provided by the Chinese Microorganism Collection Management Committee Microbiology Center.

(2) Test samples: 30 kg of ethanol and 70 kg of purified water are mixed uniformly to obtain a disinfectant 1. 30 kg of ethanol, 0.03 kg of citric acid and 69.97 kg of purified water are mixed uniformly to obtain a disinfectant 2. 0.03 kg of citric acid and 99.97 kg of purified water are mixed uniformly to obtain a disinfectant 3.

(3) Neutralizer: PBS solution containing 1 wt % soybean lecithin, 3 wt % Tween 80 and 1 wt % sodium thiosulfate.

2. Experimental Method

The experimental method is basically the same as that of Experimental Example 1, except that the action time in the suspension quantitative sterilization test is 10 min, 20 min, 30 min and 40 min. In addition, the average killing logarithmic value is calculated as follows:

Killing logarithmic value (KL)=logarithmic value of an average viable bacteria concentration of the positive control–logarithmic value of an average viable bacteria concentration of a test sample.

3. Test Results (1) The results of the neutralizer identification test meet the requirements of 2.1.1.5.7 of "*Technical Standard for Disinfection*" (2002), indicating that the neutralizer can neutralize the effects of active ingredients in the above-mentioned disinfectants on *Staphylococcus aureus*. The neutralized product has no effect on *Staphylococcus aureus* and culture medium.

(2) Results of killing test

TABLE 21

Killing effects of Disinfectant 1 on *Staphylococcus aureus*

| Groups | Logarithmic value of an concentration of viable bacteria in the positive control | Killing logarithmic value at different action time | | | |
|---|---|---|---|---|---|
| | | 10 min | 20 min | 30 min | 40 min |
| 1 | 7.22 | 0.01 | 0.03 | 0.03 | 0.03 |
| 2 | 7.67 | 0.19 | 0.24 | 0.28 | 0.29 |
| 3 | 7.66 | 0.23 | 0.28 | 0.43 | 0.48 |

| | Logarithmic value of an average concentration of viable bacteria in the positive control | Average killing logarithmic value at different action time | | | |
|---|---|---|---|---|---|
| | | 10 min | 20 min | 30 min | 40 min |
| | 7.56 | 0.17 | 0.21 | 0.28 | 0.30 |

TABLE 22

Killing effects of Disinfectant 2 on *Staphylococcus aureus*

| Groups | Logarithmic value of the concentration of viable bacteria in the positive control | Killing logarithmic value at different action time | | | |
|---|---|---|---|---|---|
| | | 10 min | 20 min | 30 min | 40 min |
| 1 | 7.18 | 2.26 | 3.46 | 4.63 | 6.02 |
| 2 | 7.41 | 2.77 | 3.72 | 4.51 | 5.93 |
| 3 | 7.30 | 2.49 | 4.02 | 4.43 | 5.76 |

| | Logarithmic value of an average concentration of viable bacteria in the positive control | Average killing logarithmic value at different action time | | | |
|---|---|---|---|---|---|
| | | 10 min | 20 min | 30 min | 40 min |
| | 7.31 | 2.51 | 3.71 | 4.51 | 5.89 |

TABLE 23

Killing effects of Disinfectant 3 on *Staphylococcus aureus*

| Groups | Logarithmic value of the concentration of viable bacteria in the positive control | Killing logarithmic value at different action time | | | |
|---|---|---|---|---|---|
| | | 10 min | 20 min | 30 min | 40 min |
| 1 | 7.03 | 0.00 | 0.03 | 0.05 | 0.05 |
| 2 | 7.12 | 0.15 | 0.16 | 0.21 | 0.22 |
| 3 | 7.17 | 0.04 | 0.04 | 0.05 | 0.06 |

| | Logarithmic value of an average concentration of viable bacteria in the positive control | Average killing logarithmic value at different action time | | | |
|---|---|---|---|---|---|
| | | 10 min | 20 min | 30 min | 40 min |
| | 7.11 | 0.06 | 0.07 | 0.10 | 0.10 |

A qualified disinfection for *Staphylococcus aureus* requires a killing log value of ≥5.0. It can be seen from the above table that low-dose ethanol and citric acid used alone basically have no sterilization and disinfection effect, while the combined use of citric acid and ethanol has a significantly improved disinfection effect, indicating that the combined use of citric acid and ethanol has a synergistic effect.

Experimental Example 5 Physical Stability

1. Experimental Method:

(1) Average particle size and PDI of the disinfection compositions prepared in Example 1 and Example 10 are measured by laser light scattering spectroscopy.

(2) Stability constant (Ke value of the optical density change percentage) of the above-mentioned disinfection compositiond is measured by a spectrophotometer to evaluate the physical stability of each emulsion formed above. Specifically, the absorbance value at 400-800 nm wavelength was measured before and after centrifugation, wherein the centrifugation is carried out for 15 min at a speed of 4000 rpm. Then Ke is calculated according to the following formula:

$$Ke=(A0-A)/A\times 100\%.$$

Wherein, A0 is the absorbance of the emulsion before centrifugation; A is the absorbance of the emulsion after centrifugation. The smaller the Ke value, the more stable the emulsion.

2. Experimental Results

TABLE 24

Test results of physical stability

| Samples | average particle size (nm) | PDI | Ke |
|---|---|---|---|
| Example 1 | 36.67 | 0.183 | <0.1 |
| Example 10 | 37.09 | 0.161 | <0.1 |

It can be seen from the above table that the average particle size of the disinfection compositions prepared in Example 1 and Example 10 are both relatively small and nanoscale, and the PDI is less than 0.3, and the Ke is less than 0.1, indicating that physical stability of the disinfection compositions provided by the present invention is good.

Experimental Example 6 Chemical Stability Experiment

1. Experimental Materials and Reagents (1) Experimental strains: *Candida albicans* (ATCC10231) fifth generation, provided by the Chinese Microorganism Collection Management Committee Microbiology Center.

(2) Organic interference substance: 30 g/L bovine serum albumin.

(3) Test samples: The disinfection compositions of different formulations prepared in Examples 1-10 and Comparative Examples 1-3. The disinfection compositions as prepared were directly used for the test without dilution.

(4) Neutralizer: D/E neutralizing broth containing 2 g/L histidine, 20 g/L soap base, 80 g/L lecithin, 100 g/L Tween 80.

(5) Medium: Sabouraud medium (Beijing Luqiao Technology Co., Ltd.).

2. Experimental Method (1) Preparation of bacterial suspensions: Bacterial suspensions for the test with a concentration of $1\times 10^7$cfu/ml-$5\times 10^7$cfu/ml are prepared with tryptone saline solution (TPS) by referring to "*Technical Standard for Disinfection*" (2002) 2.1.1.9.3.

(2) Neutralizer identification test: The test isconducted according to "*Technical Standard for Disinfection*" (2002 Edition) 2.1.1.5, using *Candida albicans* as test strains, at a water bath temperature of 20±1° C., and the test is repeated 3 times.

(3) Stability test: In accordance with 2.2.3.3 microbiological assay in "*Technical Standard for Disinfection*" (2002), each disinfection composition solution as prepared without dilution is placed in a PET packaging bottle and then stored in a incubator for three months at a temperature of 37° C. and a relative humidity of 75%, or stored for 14 days in a incubator at a temperature of 54° C. and a relative humidity of 75%.

(4) Quantitative sterilization test of the suspension:

The experimental method of the suspension quantitative sterilization test is basically the same as that of Experimental Example 2, except that the action time between the test bacteria and the disinfection composition is 1.5 minutes.

3. Test Results (1) Results of stability after storage at 37° C. for 3 months

TABLE 25

Results of stability after storage at 37° C. for 3 months

| | Action time (min) | Before storage | | After three months of storage at 37° C. | | Change rate of killing log value before and after storage (%) |
|---|---|---|---|---|---|---|
| | | Log value of average viable bacteria concentration in positive control | Average killing log value | Log value of average viable bacteria concentration in positive control | Average killing log value | |
| Example 1 | 1.5 | 6.32 | 5.97 | 6.26 | 5.93 | 0.67 |
| Example 2 | 1.5 | 6.23 | 5.89 | 6.39 | 5.85 | 0.68 |
| Example 3 | 1.5 | 6.29 | 5.92 | 6.23 | 5.88 | 0.68 |
| Example 4 | 1.5 | 6.26 | 5.91 | 6.21 | 5.86 | 0.85 |
| Example 5 | 1.5 | 6.31 | 5.85 | 6.27 | 5.78 | 1.20 |
| Example 6 | 1.5 | 6.25 | 5.87 | 6.33 | 5.80 | 1.19 |
| Example 7 | 1.5 | 6.21 | 5.83 | 6.29 | 5.76 | 1.20 |
| Example 8 | 1.5 | 6.34 | 5.74 | 6.32 | 5.67 | 1.22 |
| Example 9 | 1.5 | 6.27 | 5.78 | 6.40 | 5.73 | 0.87 |
| Example 10 | 1.5 | 6.35 | 5.86 | 6.28 | 5.78 | 1.37 |

TABLE 25-continued

Results of stability after storage at 37° C. for 3 months

| | Action time (min) | Before storage | | After three months of storage at 37° C. | | Change rate of killing log value before and after storage (%) |
|---|---|---|---|---|---|---|
| | | Log value of average viable bacteria concentration in positive control | Average killing log value | Log value of average viable bacteria concentration in positive control | Average killing log value | |
| Comparative Example 1 | 1.5 | 6.24 | 4.23 | 6.19 | 3.68 | 13.00 |
| Comparative Example 2 | 1.5 | 6.30 | 3.46 | 6.22 | 1.22 | 64.74 |
| Comparative Example 3 | 1.5 | 6.33 | 4.87 | 6.25 | 3.82 | 21.56 |

(2) Results of stability after storage at 54° C. for 14 days

TABLE 26

Results of stability after storage at 54° C. for 14 days

| | Action time (min) | Before storage | | After 14 days of storage at 54° C. | | Change rate of killing log value before and after storage (%) |
|---|---|---|---|---|---|---|
| | | Log value of average viable bacteria concentration in positive control | Average killing log value | Log value of average viable bacteria concentration in positive control | Average killing log value | |
| Example 1 | 1.5 | 6.32 | 5.97 | 6.28 | 5.96 | 0.17 |
| Example 2 | 1.5 | 6.23 | 5.89 | 6.33 | 5.87 | 0.34 |
| Example 3 | 1.5 | 6.29 | 5.92 | 6.17 | 5.90 | 0.34 |
| Example 4 | 1.5 | 6.26 | 5.91 | 6.24 | 5.89 | 0.34 |
| Example 5 | 1.5 | 6.31 | 5.85 | 6.36 | 5.82 | 0.51 |
| Example 6 | 1.5 | 6.25 | 5.87 | 6.28 | 5.85 | 0.34 |
| Example 7 | 1.5 | 6.21 | 5.83 | 6.31 | 5.80 | 0.51 |
| Example 8 | 1.5 | 6.34 | 5.74 | 6.42 | 5.72 | 0.35 |
| Example 9 | 1.5 | 6.27 | 5.78 | 6.36 | 5.76 | 0.35 |
| Example 10 | 1.5 | 6.35 | 5.86 | 6.27 | 5.83 | 0.51 |
| Comparative Example 1 | 1.5 | 6.24 | 4.23 | 6.22 | 4.18 | 1.18 |
| Comparative Example 2 | 1.5 | 6.30 | 3.46 | 6.18 | 2.10 | 39.31 |
| Comparative Example 3 | 1.5 | 6.33 | 4.87 | 6.29 | 4.62 | 5.13 |

It can be seen from the results in the above table that the change rate of the killing log value for the disinfection compositions prepared in Examples 1-10 of the present invention before and after storage at 54° C. for 14 days is less than 0.51%, and the change rate of the killing log value for the disinfection compositions prepared in Examples 1-10 of the present invention before and after storage at 37° C. for 3 months is less than 1.37%, showing significantly better stability than the disinfection compositions prepared in Comparative Examples 1-3.

Apparently, the above-described embodiments are merely examples for the purpose of clarity and are not intended to limit the embodiments. For one of ordinary skill in the art, other different forms of changes or variations can be made on the basis of the above description. It is unnecessary and impossible to be exhaustive of all implementations. Obvious changes or modifications extended therefrom are still within the protection scope of the invention.

The invention claimed is:

1. A disinfection composition, comprising the following raw materials in parts by weight:
   2.2-4.8 parts of disinfection essential oil,
   3-8 parts of polyethylene glycol hydrogenated castor oil,
   0.05-0.5 parts of phytic acid,
   0.05-0.5 parts of citric acid,
   20-40 parts of $C_2$-$C_3$ monohydric alcohol, and
   45-62.1 parts of water,
   wherein the disinfection composition has a log kill of greater than 7 in less than 1.5 minutes against *Staphylococcus aureus*, *Escherichia coli*, and *Mycobacterium chelonae* subspecies *abscessus*, and
   wherein the disinfection composition has a log kill of greater than 5 in less than 1.5 minutes against *Candida albicans*.

2. The disinfection composition according to claim 1, wherein the $C_2$-$C_3$ monohydric alcohol is ethanol, isopropanol or a mixture thereof; the polyethylene glycol hydrogenated castor oil is polyethylene glycol 40 hydrogenated castor oil, polyethylene glycol 60 hydrogenated castor oil or a mixture thereof.

3. The disinfection composition according to claim 1, wherein the disinfection essential oil is at least one selected from the group consisting of tea tree essential oil, niaouli essential oil, palmarosa essential oil, lemon mint essential oil, and *Litsea cubeba* essential oil.

4. The disinfection composition according to claim 2, wherein the disinfection essential oil is at least one selected from the group consisting of tea tree essential oil, niaouli essential oil, palmarosa essential oil, lemon mint essential oil, lemon myrtle essential oil and *Litsea cubeba* essential oil.

5. The disinfection composition according to claim 1, wherein the disinfection essential oil comprises the following raw materials in parts by weight:
   0.5-1.0 parts of tea tree essential oil,
   0.3-1.0 parts of niaouli essential oil,
   0.3-1.0 parts of palmarosa essential oil,
   0.2-1.0 parts of lemon mint essential oil, and
   0.3-1.0 parts of lemon myrtle essential oil and/or *Litsea cubeba* essential oil.

6. The disinfection composition according to claim 2, wherein the disinfection essential oil comprises the following raw materials in parts by weight:
   0.5-1.0 parts of tea tree essential oil,
   0.3-1.0 parts of niaouli essential oil,
   0.3-1.0 parts of palmarosa essential oil,
   0.2-1.0 parts of lemon mint essential oil, and
   0.3-1.0 parts of lemon myrtle essential oil and/or *Litsea cubeba* essential oil.

7. The disinfection composition according to claim 3, wherein the disinfection essential oil comprises the following raw materials in parts by weight:
   0.5-1.0 parts of tea tree essential oil,
   0.3-1.0 parts of niaouli essential oil,
   0.3-1.0 parts of palmarosa essential oil,
   0.2-1.0 parts of lemon mint essential oil, and
   0.3-1.0 parts of lemon myrtle essential oil and/or *Litsea cubeba* essential oil.

8. The disinfection composition according to claim 1, wherein the disinfection composition further comprises 0.3-1.0 part of azelaic acid and/or 4-6 parts of a cosolvent.

9. The disinfection composition according to claim 8, wherein the cosolvent is at least one selected from the group consisting of 1,2-propylene glycol, glycerin, and polyethylene glycol.

10. The disinfection composition according to claim 2, wherein the disinfection composition further comprises 0.3-1.0 part of azelaic acid and/or 4-6 parts of a cosolvent.

11. The disinfection composition according to claim 3, wherein the disinfection composition further comprises 0.3-1.0 part of azelaic acid and/or 4-6 parts of a cosolvent.

12. The disinfection composition according to claim 4, wherein the disinfection composition further comprises 0.3-1.0 part of azelaic acid and/or 4-6 parts of a cosolvent.

13. The disinfection composition according to claim 1, wherein the disinfection composition comprises the following raw materials in parts by weight:
   0.6 parts of tea tree essential oil,
   0.5 parts of niaouli essential oil,
   0.5 parts of palmarosa essential oil,
   0.2 parts of lemon mint essential oil,
   0.5 parts of *Litsea cubeba* essential oil,
   0.5 parts of azelaic acid,
   4.3 parts of polyethylene glycol 40 hydrogenated castor oil,
   0.05 parts of phytic acid,
   0.05 parts of citric acid,
   30 parts of ethanol,
   4 parts of 1,2-propylene glycol, and
   58.8 parts of water.

14. The disinfection composition according to claim 1, wherein the disinfection composition comprises the following raw materials in parts by weight:
   0.5 parts of tea tree essential oil,
   0.3 parts of niaouli essential oil,
   0.3 parts of palmarosa essential oil,
   0.5 parts of lemon mint essential oil,
   0.7 parts of *Litsea cubeba* essential oil,
   0.5 parts of azelaic acid,
   3.2 parts of polyethylene glycol 40 hydrogenated castor oil,
   0.05 parts of phytic acid,
   0.05 parts of citric acid,
   30 parts of ethanol,
   4 parts of 1,2-propylene glycol, and
   60.4 parts of water.

15. The disinfection composition according to claim 1, wherein the disinfection composition comprises the following raw materials in parts by weight:
   0.7 parts of tea tree essential oil,
   0.5 parts of niaouli essential oil,
   0.5 parts of palmarosa essential oil,
   0.3 parts of lemon mint essential oil,
   0.4 parts of *Litsea cubeba* essential oil,
   0.5 parts of azelaic acid,
   4.8 parts of polyethylene glycol 40 hydrogenated castor oil,
   0.05 parts of phytic acid,
   0.05 parts of citric acid,
   30 parts of ethanol,
   4 parts of 1, 2-propylene glycol, and
   58.2 parts of water.

16. The disinfection composition according to claim 1, wherein the disinfection composition comprises the following raw materials in parts by weight:
   0.5 parts of tea tree essential oil,
   0.5 parts of niaouli essential oil,
   0.5 parts of palmarosa essential oil,
   0.2 parts of lemon mint essential oil,
   0.5 parts of *Litsea cubeba* essential oil,
   0.5 parts of azelaic acid,
   4.6 parts of polyethylene glycol 40 hydrogenated castor oil,
   0.05 parts of phytic acid,
   0.05 parts of citric acid,
   30 parts of ethanol,
   4 parts of 1, 2-propylene glycol, and
   58.6 parts of water.

17. A method for preparing a disinfection composition, the method comprising:
   preparing a first premixture by mixing citric acid with water and/or a $C_2$-$C_3$ monohydric alcohol, or by mixing citric acid and phytic acid with water and/or a $C_2$-$C_3$ monohydric alcohol; and
   preparing a first mixture by successively mixing a polyethylene glycol hydrogenated castor oil, the first premixture and a disinfection essential oil, or by mixing a disinfection essential oil and a polyethylene glycol hydrogenated castor oil; and preparing a disinfection composition by mixing the first mixture, the first premixture and remaining raw materials,
   wherein the disinfection composition comprises the following raw materials in parts by weight:
   2.2-4.8 parts of disinfection essential oil,
   3-8 parts of polyethylene glycol hydrogenated castor oil,
   0.05-0.5 parts of phytic acid, 0.05-0.5 parts of citric acid,
20-40 parts of $C_2$-$C_3$ monohydric alcohol, and
45-62.1 parts of water,
wherein the disinfection composition has a log kill of greater than 7 in less than 1.5 minutes against *Staphylococcus aureus, Escherichia coli*, and *Mycobacterium chelonae* subspecies *abscessus*, and
wherein the disinfection composition has a log kill of greater than 5 in less than 1.5 minutes against *Candida albicans*.

18. The method according to claim 17, wherein:
preparing the first premixture further comprises mixing the citric acid, phytic acid and the water, preparing a surfactant by mixing a cosolvent and the polyethylene glycol hydrogenated castor oil, and preparing an alcoholic solution containing azelaic acid by mixing the azelaic acid and the $C_2$-$C_3$ monohydric alcohol; and
preparing the disinfection composition by successively mixing the surfactant, the first premixture, the alcoholic solution containing azelaic acid and the disinfection essential oil, or by successively mixing the surfactant, the alcoholic solution containing azelaic acid, the first premixture and the disinfection essential oil;
or wherein:
preparing the first premixture further comprises mixing the citric acid, phytic acid, the water, azelaic acid and a $C_2$-$C_3$ monohydric alcohol; and preparing a surfactant by mixing a cosolvent and the polyethylene glycol hydrogenated castor oil; and
preparing the disinfection composition by successively mixing the surfactant, the first premixture and the disinfection essential oil;
or wherein the method comprises:
preparing the first premixture further comprises mixing the citric acid, phytic acid, the water and azelaic acid, or by mixing the citric acid, phytic acid and the water; preparing a surfactant by mixing a cosolvent and the polyethylene glycol hydrogenated castor oil; and
preparing the disinfection composition by successively mixing the surfactant, the first premixture, the $C_2$-$C_3$ monohydric alcohol and the disinfection essential oil, or by successively mixing the surfactant, the $C_2$-$C_3$ monohydric alcohol, the first premixture and the disinfection essential oil;
or wherein the method comprises:
preparing the first premixture further comprises mixing the citric acid, the phytic acid and the $C_2$-$C_3$ monohydric alcohol; preparing a surfactant by mixing a cosolvent and the polyethylene glycol hydrogenated castor oil; and preparing an aqueous solution containing azelaic acid by mixing the azelaic acid and water; and
preparing the disinfection composition by successively mixing the surfactant, the first premixture, the aqueous solution containing azelaic acid and the disinfection essential oil, or by successively mixing the surfactant, the aqueous solution containing azelaic acid, the first premixture and the disinfection essential oil;
or wherein the method comprises:
preparing the first premixture further comprises mixing the citric acid and water; preparing a surfactant by mixing a cosolvent and the polyethylene glycol hydrogenated castor oil; and preparing an alcoholic solution containing azelaic acid by mixing the azelaic acid and the $C_2$-$C_3$ monohydric alcohol; and
preparing the disinfection composition by successively mixing the surfactant, the first premixture, the alcoholic solution containing azelaic acid, the phytic acid and the disinfection essential oil, or by successively mixing the surfactant, the first premixture, the phytic acid, the alcoholic solution containing azelaic acid and the disinfection essential oil, or by successively mixing the surfactant, the alcoholic solution containing azelaic acid, the phytic acid, the first premixture and the disinfection essential oil, or by successively mixing the surfactant, the alcoholic solution containing azelaic acid, the first premixture, the phytic acid and the disinfection essential oil;
or wherein the method comprises:
preparing the first premixture further comprises mixing the citric acid and a $C_2$-$C_3$ monohydric alcohol; preparing a surfactant by mixing a cosolvent and the polyethylene glycol hydrogenated castor oil; and preparing an aqueous solution containing azelaic acid by mixing the azelaic acid and water; and
preparing the disinfection composition by successively mixing the surfactant, the first premixture, the aqueous solution containing azelaic acid, the phytic acid and the disinfection essential oil, or by successively mixing the surfactant, the aqueous solution containing azelaic acid, the phytic acid, the first premixture and the disinfection essential oil, or by successively mixing the surfactant, the first premixture, the phytic acid, the aqueous solution containing azelaic acid and the disinfection essential oil; or by successively mixing the surfactant, the aqueous solution containing azelaic acid, the first premixture and the disinfection essential oil.

19. The method according to claim 17, wherein:
preparing the first mixture and preparing the disinfection composition is carried out at a vacuum pressure of greater than or equal to 0.2 MPa and a temperature of 25-45° C. under stirring at a speed of 50-150 rpm and wherein each material is fed at an interval of at least 5 minutes; or
further comprising stirring the prepared disinfection composition for at least 5 minutes at a vacuum pressure of greater than or equal to 0.4 MPa a temperature of 25-45° C. under stirring at a speed of 200-500 rpm.

20. A disinfection method, comprising applying the disinfection composition according to claim 1.

* * * * *